US008706488B2

(12) United States Patent
Edgington et al.

(10) Patent No.: US 8,706,488 B2
(45) **Date of Patent: *Apr. 22, 2014**

(54) METHODS AND APPARATUS FOR FORMANT-BASED VOICE SYNTHESIS

(71) Applicant: Nuance Communications, Inc., Burlington, MA (US)

(72) Inventors: Michael D. Edgington, Bridgewater, MA (US); Laurence Gillick, Newton, MA (US); Jordan R. Cohen, Gloucester, MA (US)

(73) Assignee: Nuance Communications, Inc., Burlington, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/779,644

(22) Filed: Feb. 27, 2013

(65) Prior Publication Data

US 2013/0179167 A1 Jul. 11, 2013

Related U.S. Application Data

(63) Continuation of application No. 11/225,524, filed on Sep. 13, 2005.

(51) Int. Cl.
*G10L 15/00* (2013.01)

(52) U.S. Cl.
USPC ........... 704/246; 704/222; 704/230; 704/251; 704/240; 704/216; 704/209; 704/219; 704/221; 704/208; 704/260; 704/261; 704/258; 704/9; 709/203; 709/206; 715/767; 379/282; 379/263

(58) Field of Classification Search
USPC ......... 704/216, 260, 221, 258, 208, 209, 219, 704/222, 230, 240, 246, 251, 261, 9; 709/206, 203; 715/767; 379/282, 283
See application file for complete search history.

(56) References Cited

U.S. PATENT DOCUMENTS 4,087,632 A * 5/1978 Hafer ............................ 704/251
5,146,539 A 9/1992 Doddington et al.
5,644,680 A * 7/1997 Bielby et al. .................. 704/240

(Continued)

FOREIGN PATENT DOCUMENTS

WO WO 99/26234 A1 5/1999

OTHER PUBLICATIONS

Acero, Formant Analysis and Synthesis Using Hidden Markov Models. Proc Eurospeech Conf. Sep. 1999;1-4.

(Continued)

*Primary Examiner* — Michael Colucci
(74) *Attorney, Agent, or Firm* — Wolf, Greenfield & Sacks, P.C.

(57) ABSTRACT

In one aspect, a method of processing a voice signal to extract information to facilitate training a speech synthesis model is provided. The method comprises acts of detecting a plurality of candidate features in the voice signal, performing at least one comparison between one or more combinations of the plurality of candidate features and the voice signal, and selecting a set of features from the plurality of candidate features based, at least in part, on the at least one comparison. In another aspect, the method is performed by executing a program encoded on a computer readable medium. In another aspect, a speech synthesis model is provided by, at least in part, performing the method.

27 Claims, 7 Drawing Sheets

(56) References Cited

U.S. PATENT DOCUMENTS

| | | | | | |
|---|---|---|---|---|---|
| 5,664,054 | A * | 9/1997 | Su | ........ | 704/219 |
| 5,867,814 | A * | 2/1999 | Yong | ........ | 704/216 |
| 6,047,254 | A * | 4/2000 | Ireton et al. | ........ | 704/209 |
| 6,064,960 | A * | 5/2000 | Bellegarda et al. | ........ | 704/260 |
| 6,101,470 | A * | 8/2000 | Eide et al. | ........ | 704/260 |
| 6,260,009 | B1 * | 7/2001 | Dejaco | ........ | 704/221 |
| 6,366,883 | B1 * | 4/2002 | Campbell et al. | ........ | 704/260 |
| 6,484,139 | B2 * | 11/2002 | Yajima | ........ | 704/230 |
| 6,505,152 | B1 | 1/2003 | Acero | | |
| 6,708,154 | B2 * | 3/2004 | Acero | ........ | 704/260 |
| 6,801,931 | B1 * | 10/2004 | Ramesh et al. | ........ | 709/206 |
| 8,447,592 | B2 | 5/2013 | Edgington et al. | | |
| 2001/0007973 | A1 * | 7/2001 | Yajima | ........ | 704/208 |
| 2001/0021904 | A1 | 9/2001 | Plumpe | | |
| 2002/0049594 | A1 * | 4/2002 | Moore et al. | ........ | 704/258 |
| 2002/0135618 | A1 * | 9/2002 | Maes et al. | ........ | 345/767 |
| 2005/0027528 | A1 * | 2/2005 | Yantorno et al. | ........ | 704/246 |
| 2005/0137862 | A1 * | 6/2005 | Monkowski | ........ | 704/222 |
| 2005/0182619 | A1 * | 8/2005 | Azara et al. | ........ | 704/9 |
| 2006/0074676 | A1 * | 4/2006 | Deng et al. | ........ | 704/261 |

OTHER PUBLICATIONS

Fushikida, A Formant Extraction Method Using Autocorrelation Domain Inverse Filtering and Focusing method. ICASSP 88. Apr. 11, 1998;E2.8:2260-3.

George et al., Speech Analysis/Synthesis and Modification Using an Analysis-by-Synthesis/Overlap-Add Sinusoidal Model. IEEE Trans Speech Audio Proc. Sep. 1997;5(5):389-406.

* cited by examiner

METHODS AND APPARATUS FOR FORMANT-BASED VOICE SYNTHESIS

RELATED APPLICATIONS

This Application claims the benefit under 35 U.S.C. §120 of U.S. Application Ser. No. 11/225,524, entitled "METHODS AND APPARATUS FOR FORMANT-BASED VOICE SYSTEMS" filed on Sept. 13, 2005, which is herein incorporated by reference in its entirety.

FIELD OF THE INVENTION

The present invention relates to voice synthesis, and more particularly, to formant-based voice synthesis.

BACKGROUND OF THE INVENTION

Speech synthesis is a growing technology with applications in areas that include, but are not limited to, automated directory services, automated help desks and technology support infrastructure, human/computer interfaces, etc. Speech synthesis typically involves the production of electronic signals that, when broadcast, mimic human speech and are intelligible to a human listener or recipient. For example, in a typical text-to-speech application, text to be converted to speech is parsed into labeled phonemes which are then described by appropriately composed signals that drive an acoustic output, such as one or more resonators coupled to a speaker or other device capable of broadcasting sound waves.

Speech synthesis can be broadly categorized as using either concatenative or formant-based methods to generate synthesized speech. In concatenative approaches, speech is formed by appropriately concatenating pre-recorded voice fragments together, where each fragment may be a phoneme or other sound component of the target speech. One advantage of concatenative approaches is that, since it uses actual recordings of human speakers, it is relatively simple to synthesize natural sounding speech. However, the library of pre-recorded speech fragments needed to synthesize speech in a general manner requires relatively large amounts of storage, limiting application of concatenative approaches to systems that can tolerate a relatively large footprint, and/or systems that are not otherwise resource limited. In addition, there may be perceptual artifacts at transitions between speech fragments.

Formant-based approaches achieve voice synthesis by generating a model configured to build a speech signal using a relatively compact description or language that employs at least speech formants as a basis for the description. The model may, for example, consider the physical processes that occur in the human vocal tract when an individual speaks. To configure or train the model, recorded speech of known content may be parsed and analyzed to extract the speech formants in the signal. The term formant refers herein to certain resonant frequencies of speech. Speech formants are related to the physical processes of resonance in a substantially tubular vocal tract. The formants in a speech signal, and particularly the first three resonant frequencies, have been identified as being closely linked to, and characteristic of, the phonetic significance of sounds in human speech. As a result, a model may incorporate rules about how one or more formants should transition over time to mimic the desired sounds of the speech being synthesized.

Generally speaking, there are at least two phases to formant-based speech synthesis: 1) generating a speech synthesis model capable of producing a formant tract characteristic of target speech; and 2) speech production. Generating the speech synthesis model may include analyzing recorded speech signals, extracting formants from the speech signals and using knowledge gleaned from this information to train the model. Speech production generally involves using the trained speech synthesis model to generate the phonetic descriptions of the target speech, for example, generating an appropriate formant tract, and converting the description (e.g., via resonators) to an acoustic signal comprehensible to a human listener.

SUMMARY OF THE INVENTION

On embodiment according to the present invention includes a method of processing a voice signal to extract information to facilitate training a speech, synthesis model, the method comprising acts of detecting a plurality of candidate features in the voice signal, performing at least one comparison between one or more combinations of the plurality of candidate features and the voice signal, and selecting a set of features from the plurality of candidate features based, at least in part, on the at least one comparison.

Another embodiment according to the present invention includes a computer readable medium encoded with a program for execution on at least one processor, the program, when executed on the at least one processor, performing a method of processing a voice signal to extract information from the voice signal to facilitate training a speech synthesis model, the method comprising acts of detecting a plurality of candidate features in the voice signal, performing at least one comparison between one or more combinations of the plurality of candidate features and the voice signal, and selecting a set of features from the plurality of candidate features based, at least in part, on the at least one comparison.

Another embodiment according to the present invention includes computer readable medium encoded with a speech synthesis model adapted to, when operating, generate human recognizable speech, the speech synthesis modeled trained to generate the human recognizable speech, at least in part, by performing acts of detecting a plurality of candidate features in the voice signal, performing a comparison between combinations of the candidate features and the voice signal, and selecting a desired set of features from the candidate features based, at least in part, on the comparison.

DETAILED DESCRIPTION

The efficacy by which a speech synthesis model can produce speech that sounds natural and/or is sufficiently intelligible to a human listener may depend, at least in part, on how well training data used to train the speech synthesis model describes the phonemes and other sound components of the target language. The quality of the training data, in turn, may depend upon how well characteristics and features of voice signals used to describe speech can be identified and selected from the voice signals. Applicant has appreciated that various methods of analysis by synthesis facilitate the selection of features from a voice signal that, when synthesized, produce a synthesized voice signal that is most similar to the original voice signal, either actually, perceptually, or both. The selected features may be used as training data to train a speech synthesis model to produce relatively natural sounding and/or intelligible speech.

Figure 1:
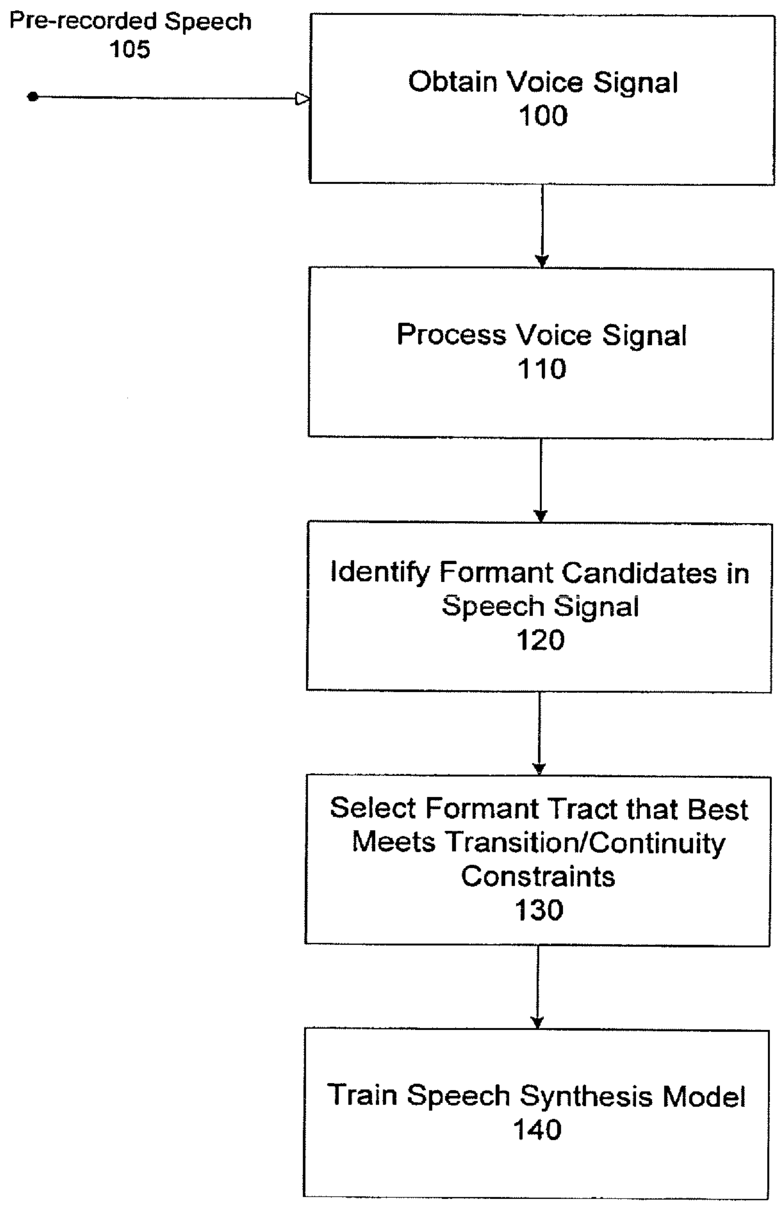
FIG. 1 illustrates a conventional method of selecting formants for use in training a speech synthesis model.

As discussed above, generating a speech synthesis model typically includes an analysis phase wherein pre-recorded voice signals are processed to extract formant characteristics from the voice signals, and a training phase wherein the formant transitions for various language phonemes are used as a training set for a speech synthesis model. By way of highlighting at least some of the distinctions between conventional analysis and aspects of the present invention, FIG. 1 illustrates a conventional method of generating a formant-based speech synthesis model. In act 100, a voice signal is obtained for analysis. For example, a speaker may be recorded while reading a known text containing a variety of language phonemes, such as exemplary vowel and consonant sounds, nasal intonations, etc. The pre-recorded speech signal 105 may then be digitized or otherwise formatted to facilitate further analysis.

In act 110, the digitized voice signal may be parsed into segments of speech at regular intervals of time. For example, the digitized speech signal may be segmented into 20 ms windows at 10 ms intervals, such that the windows overlap each other in time. Each window may then be analyzed to identify formant candidates in the respective speech fragment. The windowing procedure may also process the voice signal, for example, by the use of a Hanning window. Processed or unprocessed, the discrete intervals of the speech signal are referred to herein as frames. In act 120, formant candidates are identified in each of the frames. Multiple candidates for the actual formants are typically identified in each frame due to the difficulty in accurately identifying the true formants and their associated parameters (e.g., formant location, bandwidth and amplitude), as discussed in further detail below.

In act 130, the candidate formants and associated parameters are further analyzed to identify the most likely formant sequence or formant tract. Conventional methods employ some form or combination of continuity constraints to select a formant tract from the candidates identified in act 120. Such conventional methods are premised on the notion that the true formant tract in the speech signal will have a relatively smooth transition over time. This smoothness constraint may be employed to eliminate candidates and to select formants for each frame that maximize the smoothness or best satisfy one or more continuity constraints between successive frames in the voice signal. The selected formants from each frame together make up the formant tract used as the description of the respective pre-recorded voice signal. In particular, the formant tract operates as a compact description of the phonetic make-up of the voice signal.

The term "tract" refers herein to a sequence of elements, typically ordered according to the respective element's position in time (unless otherwise specified). For example, a formant tract refers to a sequence of formants and conveys information about how the formants transition over time (e.g., about frame to frame transitions). Similarly, a feature tract is a sequence of one or more features. Each element in the tract may be a single value or multiple values. That is, a tract may be a sequence of scalar values, vectors or a combination of both. Each element need not contain the same number of values, and may represent and/or refer to any feature, characteristic or phenomena.

The selected formant tract may then be used to train the speech synthesis model (act 140). Common training schemes include Hidden Markov Models (HMM); however, any training method may be used. It should be appreciated that multiple speech signals may be analyzed and decomposed into formant tracts to provide training data that exemplifies how formants transition over time for a wide range of language phonemes for which the speech synthesis model in being trained. The trained speech synthesis model, therefore, is typically configured to generate a formant tract that describes a given phoneme that the model has been requested to synthesize. The formant tracts corresponding to the phonemes or other components of a target speech may then be generated as a function of time to produce the description of the target speech. This formant description may then be provided to one or more resonators for conversion to an acoustical signal comprehensible to a human listener.

Applicant has appreciated that conventional methods for selecting formants identified in a speech signal may not result in selected formants that provide a faithful description of the voice signal, resulting in a speech synthesis model that may not produce particularly high fidelity speech (e.g., natural sounding and/or intelligible speech). In particular, Applicant has appreciated that conventional constraints (e.g., continuity constraints, derivative constraints, etc.) applied to a formant tract may not be an optimal measure for selecting formants from formant candidates extracted from a speech signal. Applicant has noted that continuity and/or relatively smooth derivative characteristics in the formant tract may not be the best indicator of and/or may not lend itself to the most intelligible and/or natural sounding speech.

In one embodiment according to the present invention, formant tracts employed as training data are selected by selecting formants from available formant candidates based on a comparison with the speech signal. Exploiting the actual voice signal in the selection process may facilitate identifying formants that generate speech that is perceptually more similar to the voice signal then formants selected by forcing constraints on the formant tract that may have little correlation to how intelligible the synthesized speech ultimately sounds. Furthermore, Applicant has identified and appreciated that a speech synthesis model may be improved by incorporating, in addition to formant information, parameters describing other features of the voice signal into one or more feature tracts used to train the speech synthesis model.

Various embodiments of the present invention derive from Applicant's appreciation that analysis by synthesis may facilitate selecting features of a speech signal to train a speech synthesis model capable of producing speech that is relatively natural sounding and/or easily understood by a human listener. The resulting, relatively compact, speech synthesis model may then be employed in applications wherein resources are limited and/or are at a premium, in addition to applications wherein resources may not be scarce.

One embodiment of the present invention includes a method of processing a voice signal to determine characteristics for use in training of a speech synthesis model. The method comprises acts of detecting candidate features in the voice signal, performing a comparison between various combinations of the candidate features and the voice signal, and selecting a desired set of features from the candidate features based, at least in part, on the comparison. For example, in some embodiments, one or more formants are detected in the voice signal, and information about the detected formants are grouped into candidate feature sets.

Combinations of the candidate feature sets (e.g., a candidate feature set from each of a plurality of frames formed by respective intervals of the voice signal) may be grouped into candidate feature tracts presumed to provide a description of the voice signal. The voice signal, the candidate feature tracts or both may be converted into a format that facilitates a comparison between each candidate feature tract and the voice signal. The candidate feature tract that, when synthesized, produces a synthesized voice signal most similar to the original voice signal, may be selected as training data to train the speech synthesis model.

In another embodiment, a speech synthesis model trained via training data selected according to one or more analysis by synthesis methods is stored on a device to synthesize speech. In some embodiments, the device is a generally resource limited device, such as a cellular or mobile telephone. The speech synthesis model may be configured to convert text into speech so that small message service (SMS) messages may be listened to, or a user can interact with a telephone number directory via a voice interface. Other applications for said trained speech synthesis model include, but are not limited to, automated telephone directories, automated telephone services such as help desks, mails services, etc.

Following below are more detailed descriptions of various concepts related to, and embodiments of, methods and apparatus according to the present invention. It should be appreciated that various aspects of the inventions described herein may be implemented in any of numerous ways. Examples of specific implementations are provided herein for illustrative purposes only.

As discussed above, formants have been shown to be significantly correlated with the phonetic composition of speech. However, the true formants in speech are generally not trivially identified and extracted from a speech signal. Formant identification approaches have included various techniques of analyzing the frequency spectrum of speech signals to detect the speech formants. The formants, or resonant frequencies, often appear as peaks or local maxima in the frequency spectrum. However, noise in the voice signal or spectral zeroes in the spectrum often obscure formant peaks and cause "peak picking" algorithms to be generally error prone. To reduce the frequency of error, additional complexity may be added to the criteria used to identify true formants. For example, to be identified as a formant, the frequency peak may be required to meet a certain bandwidth and/or amplitude requirement. For example, peaks having bandwidths that exceed some predetermined threshold may be discarded as non-formant peaks. However, such methods are still vulnerable to mischaracterization.

To combat the general difficulty in identifying formants, a large number of formant candidates may be selected from the speech signals. Using a more inclusive identification scheme reduces the probability that the true formants will go undetected. By the same token, at least some (and likely many) of the identified formants will be spurious. That is, the inclusive identification scheme will generate numerous false positives. For example, one method of identifying candidate formants includes Linear Predictive Coding (LPC), wherein a predictor polynomial describes possible frequency and bandwidths for the formants. However, some of the identified formants are not true speech formants, resulting not from resonant frequencies, but from other voice phenomena, noise, etc. Numerous other methods have been used to identify multiple candidate formants in a speech signal.

The term "candidate" is used to describe an element (e.g., a formant, characteristic, feature, set of features, etc.) that is identified for potential use, for example, as a descriptor in training a speech synthesis model. Candidate elements may then be further analyzed to select desired elements from the identified candidates. For example, a pool of candidate formants (however identified) may be subjected to further processing in an attempt to eliminate spurious formants identified in the signal, i.e., to eliminate false positives. Predetermined criteria may be used to discard formants believed to have been identified erroneously in the initial formant detection stage, and to select what is believed to be the actual formants in the speech signal.

As discussed above, conventional methods of selecting the formant tract from candidate formants typically involve enforcing continuity and/or derivative constraints on the formant tract as it transitions between frames, or other measures that focus on characteristics of the resulting formant tracts. However, as indicated above, such selection methods are prone to selecting sub-optimal formant tracts. In particular, conventional selection methods may often select formant tracts that provide a relatively inaccurate description of the speech such that a speech synthesis model so trained may not produce particularly high quality speech. In one embodiment, various analysis by synthesis methods, in accordance with aspects of the present invention, are employed to improve upon the selection process.

Figure 2:
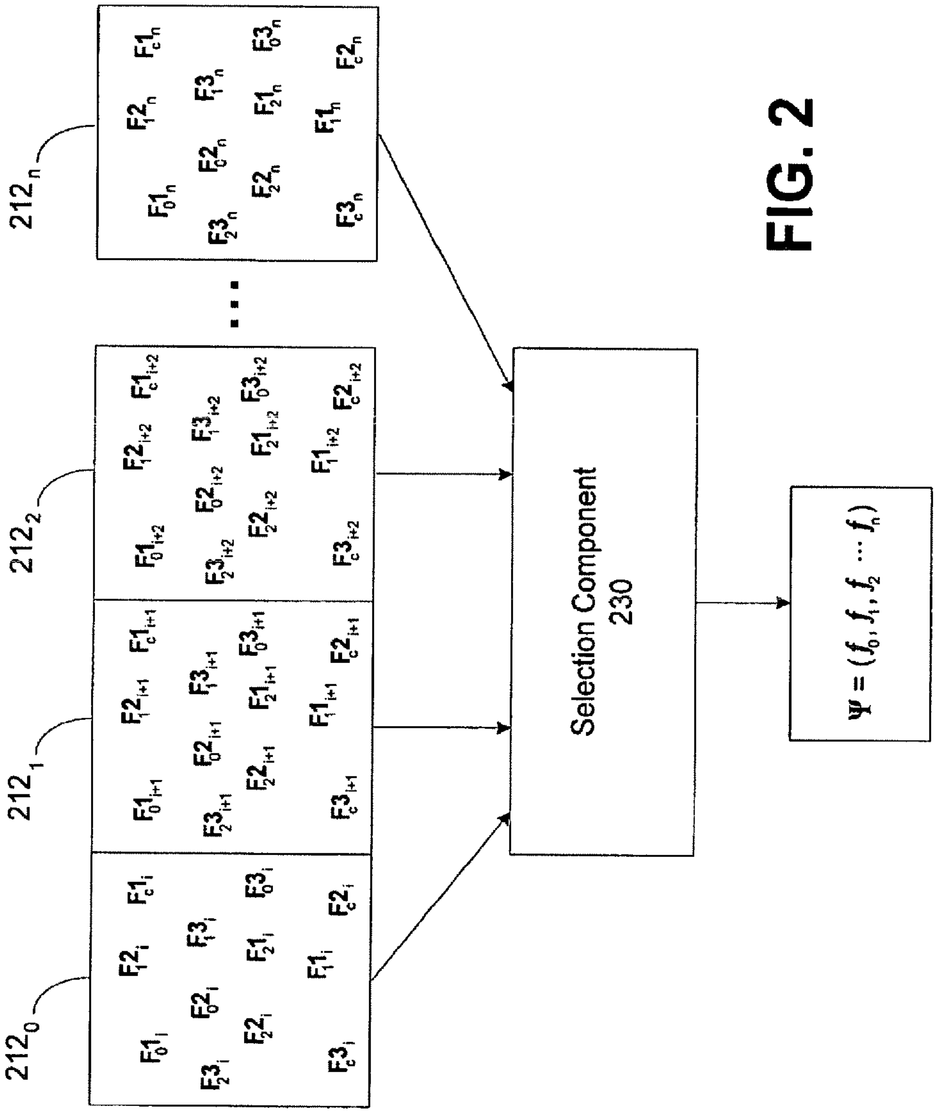
FIG. 2 illustrates a method of selecting formants for use in training a speech synthesis model, in accordance with one embodiment of the present invention.

FIG. 2 illustrates a method of selecting a formant tract from formant candidates, in accordance with one embodiment of the present invention. Frames 212 (e.g., exemplary frames 21201 21211 2122, etc.) represent a number of frames taken from a speech signal, for example, a pre-recorded voice signal that is typically of known content. For example, each frame may be a 20 ms window of the speech signal; however, any interval may be used to segment a voice signal into frames. Each window may overlap in time, or be mutually exclusive segments of the speech signal. The frames may be chosen such that they fall on phoneme boundaries (e.g., non-uniform intervals) or chosen based on other criteria such as using a window of uniform duration.

In each frame, formants F are identified by some desired detection method, for example, by performing LPC on the speech signal. In the example of FIG. 2, the first three formants F1, F2 and F3 are considered to carry the most significant phonetic information, although any other speech characteristic may be used alone or in combination with the formants to provide training data for a speech synthesis model. In FIG. 2, exemplary formants F identified in each frame by one or more detection methods are shown inside the respective frame 212 in which it was detected to illustrate the detection process. Each formant F may be a vector quantity describing any number of parameters that describe the associated formant. For example, F2 may be a vector having components for the location of the formant, the bandwidth of the formant, and/or the amplitude of the formant. That is, the formant vector may be defined as $F=(\lambda_r, \lambda_w, \delta)$, where $\lambda_r$ represents the resonant frequency (e.g., the peak frequency), $\lambda_w$, represents the width of the frequency band, and $\delta$ represents the magnitude of the peak frequency.

Multiple candidates for each of the first three formants F1, F2 and F3 may be identified in each frame. For example, c candidates were chosen for each of frames $212_0$-, $212_n$, where c may be the same or different for each frame and/or different for each formant in each frame. The candidate formants are then provided to selection criteria 230, which selects one formant vector f=<F1, F2, F3> for each frame in the speech signal. Accordingly, the result of selection criteria 230 is a formant tract $\Psi=f_0, f_1, f_2 \ldots f_n>$ where n is the number of frames in the speech signal. Formant tract Ψ may then be used as training data that characterize formant transitions for one or more phonemes or other sound components in voice signal 205, as described in further detail below.

It should be appreciated that the quality of speech synthesized by a model trained by various selected formant tracts Ψ may depend in significant part on how well Ψ describes the voice signal. Accordingly, Applicant has developed various methods that employ the actual voice signal to facilitate selecting the most appropriate formants to produce formant tract Ψ. For example, selection component 230 may perform various comparisons between the actual voice signal and voice signals synthesized from candidate formant tracts, such that the formant tract Ψ that is ultimately selected produces a voice signal, when synthesized, that most closely resembles the actual voice signal from which the formant tract was extracted. Various analysis by synthesis methods may result in a speech synthesis model that produces higher fidelity speech, as discussed in further detail below.

As discussed above, Applicant has appreciated that formants alone may not capture all the important characteristics of a voice signal that may be significant in producing quality synthesized speech. Various analyses by synthesis techniques may be used to select an optimal feature tract, wherein the features may include one or more formants, alone or in combination with, other features or characteristics of the voice signal. For example, exemplary features include one or any combination pitch, voicing, spectral slope, timing, timbre, stress, etc. Any property or characteristic indicative of a feature may be extracted from the voice signal. It should be appreciated that one or more formant features may be used exclusively or in combination with any one or combination of other features, as the aspects of the invention are not limited in this respect.

Figure 3:
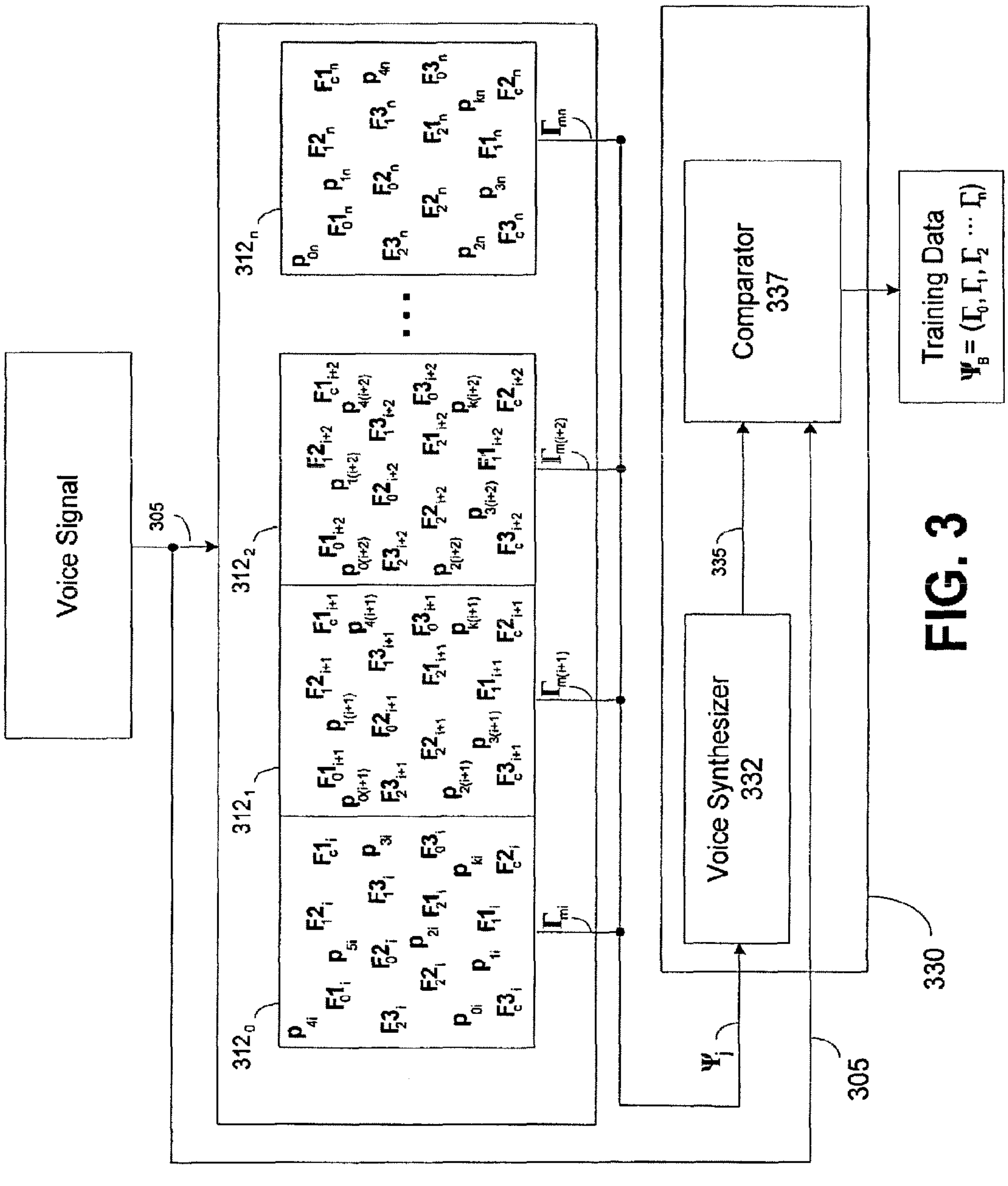
FIG. 3 illustrates a method of selecting feature tracts from identified candidate feature tracts, in accordance with one embodiment of the present invention.

FIG. 3 illustrates a generalized method for selecting a feature tract associated with a voice signal from a pool of candidate feature tracts identified in the voice signal, in accordance with one embodiment of the present invention. Synthesized voice signals formed from candidate feature tracts may be compared to the actual voice signal. The synthesis may include converting the candidate feature tracts to a speech waveform or some other intermediate or alternative format. The feature tract resulting in a synthesized voice signal (or other intermediate format) that most closely resembles the actual voice signal (e.g., according to any one or combination of predetermined similarity measures) may be selected as the feature tract used as training data to train a voice synthesis model, as discussed below.

In FIG. 3, a voice signal 305, for example, a voice recording of a speaker reciting a known text having any number of desired sounds and/or phonemes is provided. Voice signal 305 is processed to segment the voice signal into a desired number of frames or windows for further analysis. For example, voice signal 305 may be parsed to form frames $312_0$-$312_n$, each frame being of a predetermined time interval. Each frame may then be analyzed to identify any number of features to be used as descriptors to train a speech synthesis model. In FIG. 3, features to be identified include the first three formants F1, F2 and F3. In addition, various other features p may be identified in the voice signal. For example, features p may include pitch, voicing, timbre, one or more higher level formants, etc. Any one or combination of features may be identified in the voice signal, as the aspects of the invention are not limited in this respect.

As discussed above, the detection process may include identifying multiple candidates for any particular feature to reduce the chance of noise or spectral zeroes obscuring the actual features being detected, or to mitigate otherwise failing to identify the true features of interest in the voice signal. Accordingly, in each frame, numerous feature candidates may be identified. For example, LPC may be used to identify formant candidates. Similarly, other feature detection algorithms may be used to identify other features or to identify candidate formants in the voice signal. As a result, each frame may produce multiple potential combinations of features. That is, each frame may have multiple candidate feature vectors Γ, where the feature vector Γ has a component for each feature of interest being identified in the voice signal. Each component may, in turn, be a vector or scalar quality or some other representation. For example, each component associated with a formant may have values corresponding to formant parameters such as peak frequency, bandwidth, amplitude, etc. Similarly, components associated with other features may have one or multiple values with which to characterize or otherwise represent the feature as desired.

Moreover, the process of feature identification will produce multiple candidate feature vectors F for each respective frame. As a result, the feature tract $\Psi_B=(\Gamma_0, \Gamma_1, \Gamma_2 \ldots \Gamma_n)$, ultimately selected for use in training the speech synthesis model may be chosen from a relatively large number of possible combinations of candidate features. In the embodiment illustrated in FIG. 3, each candidate feature tract $\Psi_j$ that can be formed from the candidate features identified in the voice signal are compared to the original voice signal, and the feature tract that most closely resembles the voice signal is chosen as the description used in training the voice synthesis model with respect to any of various sounds and/or phonemes in the corresponding voice signal.

For example, a feature vector $\Gamma_{mi}$ may be chosen from each frame to form candidate feature tract $\Psi_j$, where m is the index identifying the particular feature vector in a frame, and i is the frame from which the feature vector is chosen. Feature tract $\Psi_i$ may then be provided to voice synthesizer 332 to convert the feature tract into a synthesized voice signal 335. Numerous methods of transforming a description of a voice signal into a relatively human intelligible voice signal are known in the art, and will not be discussed in detail herein. For example, one or a combination of resonators may be employed to convert the feature tract into a voice waveform which may be stored, further processed or otherwise provided for comparison with the actual voice signal or appropriate portion of the voice signal. Alternatively, voice synthesizer may convert the feature tract into an intermediate format, such as any number of digital or analog sound formats for comparison with the actual voice signal.

Voice synthesizer 332 may be any type of component or algorithm capable of reconstituting a voice signal in some suitable format from the selected description of the voice signal (e.g., reconstituting the voice signal from the relatively compact description Ψ). It should be appreciated that voice synthesizer 332 may provide a voice signal from a candidate feature tract in digital or analog form. Any format that facilitates a comparison between the synthesized voice signal and the actual voice signal may be used, as the aspects of the invention are not limited in this respect.

The synthesized voice signal 335 and the actual voice signal 305 may then be provided to comparator 337. In general, comparator 337 analyzes the two voice signals and provides a similarity measure between the two signals. For example, comparator 337 may compute a difference between the two voice signals, wherein the magnitude of the difference provides the similarity measure; the smaller the difference, the more similar the two signals (e.g., a least squares distance measure). However, it should be appreciated that comparator 337 may perform any type of analysis and/or comparison of the voice signals. In particular, comparator 337 may be provided with any level of sophistication to analyze the voice signals according to, for example, an understanding of particular differences that will result in speech that sounds less natural and/or is less intelligible to the human listener.

Applicant has appreciated that certain relatively large differences in the two signals may not result in proportional perceptual differences to a human listener. Likewise, Applicant has identified that certain characteristics of the voice signal have greater impact on how the voice signal is perceived by the human ear. This knowledge and understanding of what differences may be perceptually significant may be incorporated into the analysis performed by comparator 337. It should be appreciated that any comparison and/or analysis may be performed that results in some measure of the similarity of the synthesized and actual voice signals, as the aspects of the invention are not limited for use with any particular comparison, analysis and/or measure.

After each candidate feature tract $\Psi_j$ has been synthesized and compared with the actual voice signal, the feature tract $\Psi_B$ resulting in a synthesized voice signal most similar to the actual voice signal or portion of the voice signal may be selected as training data associated with voice signal 305 to be used in training the voice synthesis model on one or more phonemes or sound components present in the voice signal. It should be appreciated that any number of candidate feature tracts may be used in the comparison, as the aspects of the invention are not limited in this respect. As discussed in further detail below, this procedure may be repeated on any number of voice signals of any type and variety to provide a robust set of training data to train the speech synthesis model.

Figure 4:
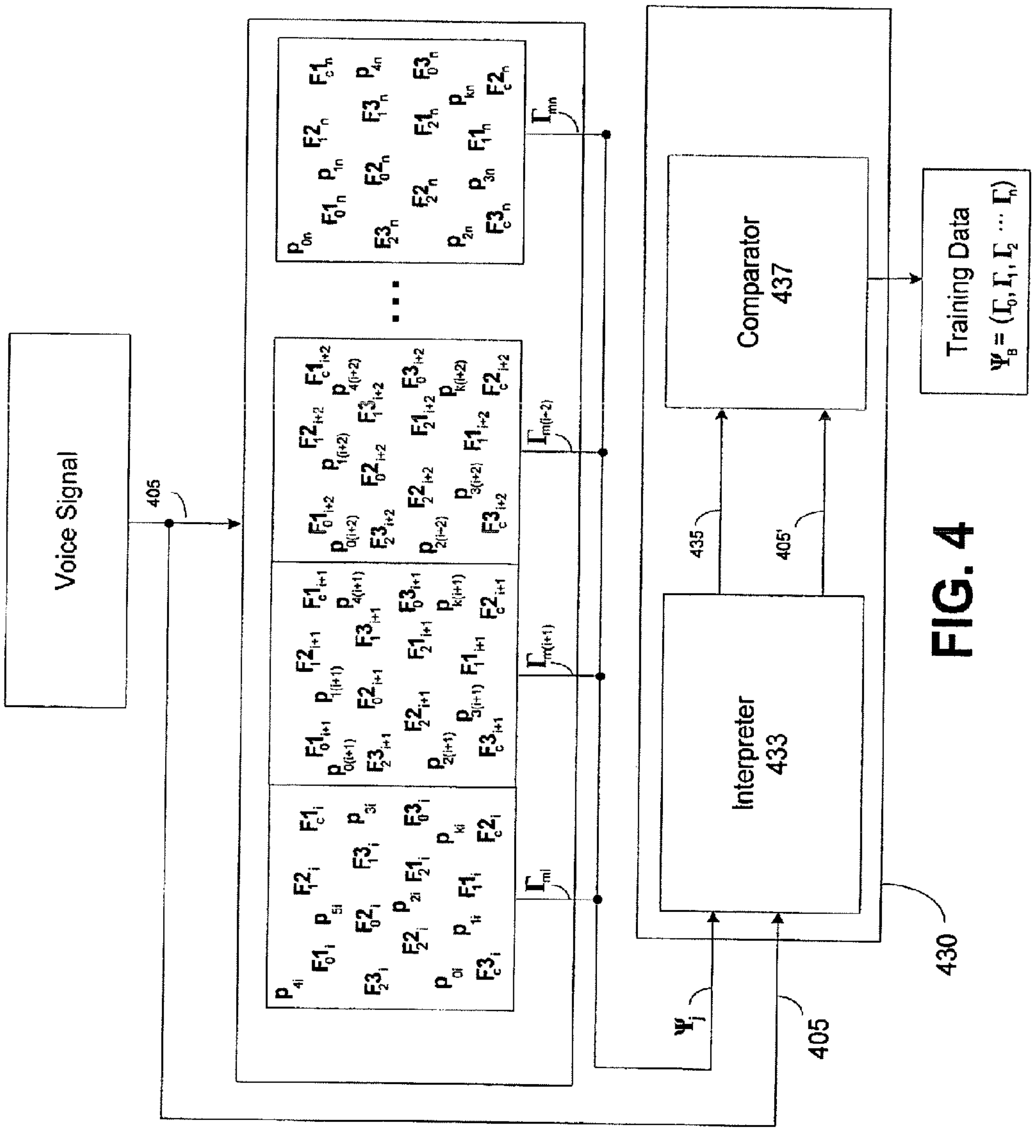
FIG. 4 illustrates a method of selecting feature tracts from identified candidate feature tracts, in accordance with another embodiment of the present invention.

FIG. 4 illustrates a system and method of selecting a feature tract characteristic of a voice signal, in accordance with one embodiment of the present invention. The identification phase, wherein candidate features are detected in voice signal 405 may be performed substantially as described in connection with the embodiment illustrated in FIG. 3. However, FIG. 4 illustrates an alternative selection process. Rather than recreating a waveform from each candidate feature tract $\Psi_j$ (as described in one embodiment of FIG. 3) for comparison with the actual voice signal, an interpreter 433 may be provided that processes feature tract $\Psi_j$ and the actual voice signal to convert the signals to an intermediate format for comparison. In some embodiments, the response of, for example, resonators in a voice synthesis apparatus to a known feature tract $\Psi_j$ is generally known or can be determined, such that there may be no need to actually produce the waveform. The feature tract $\Psi_j$ and the actual signal can be compared in an intermediate format.

For example, interpreter 433 may perform a function H such that $H(\Psi_j)=Y^*$, where $Y^*$ is the feature tract expressed in an intermediate format. Similarly, interpreter 433 may perform a function G such that G(S)=Y, where S is the appropriate portion of voice signal 405 and Y is the voice signal expressed in the intermediate format. Since both signals are in the same general format, they can be compared by comparator 437 according to any desired comparison scheme that provides an indication of the similarity between Y and Y*. Accordingly, the selection process may include selecting the $\Psi_j$ that minimizes differences between Y and Y*. As discussed above, the difference may include any measure, for example, a least squares distance, or may be based on a comparison that incorporates information about what differences may have greater or lesser perceptual impact on the resulting synthesized voice signal. It should be appreciated that any comparison may be used, as the aspects of the invention are not limited in this respect.

In some embodiments, the voice signal Y is already in the proper format. For example, the digital format in which the voice signal is stored may operate as the intermediate format. Accordingly, in such embodiments, interpreter 433 may only operate on the feature tract via a function H that converts the feature tract into the same format as the voice signal. It should be appreciated that either the voice signal, the feature tract or both may be converted to a new format to prepare the two signals 435 and 405' for comparison and interpreter 433 may perform any type of conversion that facilitates a comparison between the two signals, as the aspects of the invention are not limited in this respect.

It should be appreciated that feature tracts may be selected according to the above for any number and type of voice signals. As a general matter, feature tracts are selected from chosen voice signals such that the training mechanism used to train the speech synthesis model has feature tracts corresponding to the significant phonemes in the target language of the speech desired to be synthesized. For example, one or more feature tracts may be selected that describe each of the vowel and consonant sounds used in the target language. By extension, feature tracts may be selected to train a speech synthesis model in any number of languages by performing any of the exemplary embodiments described above on voice signals recorded in other languages. In addition, feature tracts may be selected to train a speech synthesis model to provide speech with a desired prosody or emotion, or to provide speech in a whisper, a yell or to sing the speech, or to provide some other voice effect, as discussed in further detail below.

Figure 5A:
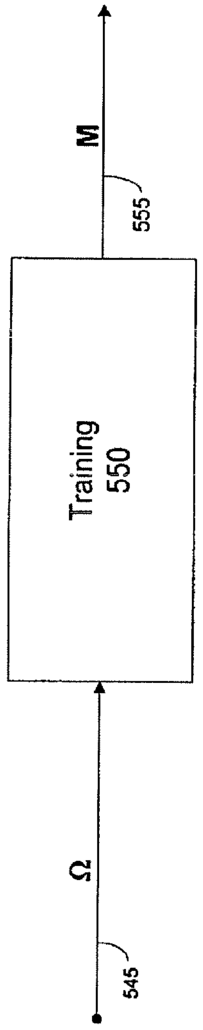
FIG. 5A illustrates a method of training a voice synthesis model with training data obtained according to various aspects of the present invention.

FIG. 5A illustrates one method of producing a speech synthesis model from feature tracts selected according to various aspects of the invention. At a general level, training 550 receives training data 545 (e.g., exemplary training data Ω) and produces a speech synthesis model 555 (e.g., exemplary model M) based on the training data. It follows that, as a general matter, the better the training data, the better the model M will be at generating desired speech (e.g., natural, intelligible speech and/or speech according to a desired prosody, emphasis or effect).

As discussed above, many forms of training a speech synthesis model M are known in the art, and any training mechanism may be used as training 550, as the aspects of the invention are not limited in this respect. For example, Hidden Markov Models (HMM) are commonly used and well understood techniques for training a speech synthesis model. In the embodiment in FIG. 5A, training 550 uses feature tracts selected using any of various comparison methods between candidate feature tracts and the voice signal, or portions of a voice signal from which the features were identified.

In particular, training 550 may receive training data $\Omega=*\Psi_{B0}, \Psi_{B1}, \Psi_{B2}, \ldots \Psi_{Bw})$, wherein the various selected feature tracts Ψ provide a desired coverage of the phonemes that constitute the desired speech. In some embodiments, training data 545 includes feature tracts that describe phonemes of speech deemed significant in forming natural and/or intelligible speech. For example, the training data may include one or more feature tracts that describe each of the vowel sounds of a target language. In addition, the various feature tracts may describe various consonant sounds, sibilance characteristics, transitions between one more phonemes, etc. The feature tracts provided to training may be chosen at any level of sophistication to train the speech synthesis model, as the aspects of the invention are not limited in this respect. Training 550 then operates on the training data and generates speech synthesis model 555, for example, exemplary speech model M.

Figure 5B:
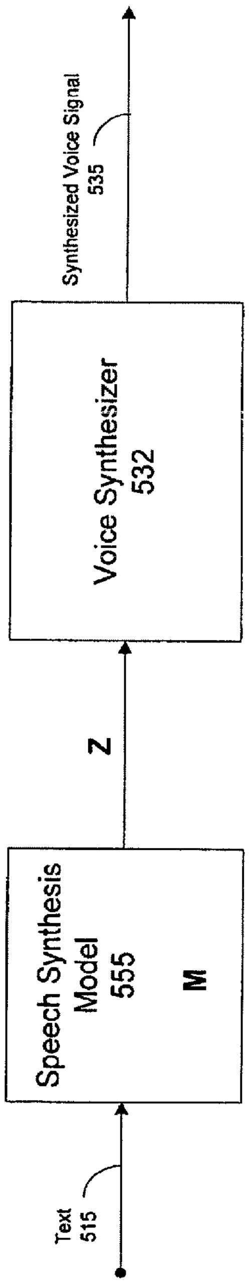
FIG. 5B illustrates a method of producing synthesized speech using a model trained with training data obtained according to various aspects of the present invention.

FIG. 5B illustrates one method of generating synthesized speech via speech synthesis model M. In particular, model M may be used to generate synthesized speech from a target text. For example, text 515 may be any text (or speech described in a similar non-auditory format) that is desired to be converted into a voice signal. Text 515 may be parsed to segment the text into component phonemes (or other desired segments or sound fragments), either independently or by model M. The component phonemes are then processed by model M, which generates feature tracts that describe the component sounds identified in the text, to mimic a speaker reciting text 515. For example, model M may generate a description of the voice signal $X=(\Psi_0', \Psi_1', \Psi_2', \ldots \Psi_k')$, where the various Ψ's are feature tracts determined by model M that describe the target voice signal. Description X may then be provided to voice synthesizer 532 to convert the description into a human intelligible voice signal, e.g., to produce synthesized voice signal 535.

As discussed above, by utilizing a formant based description (and perhaps other selected features), a speech synthesis model can be generated that uses a relatively compact language to describe speech. Accordingly, speech synthesis models so derived may be employed in various applications where resources may be generally scarce, such as on a cellular phone. Applicant has appreciated that numerous applications may benefit from such models generated using methods in accordance with the present invention, where compact description and relatively high fidelity (e.g., natural sounding and/or intelligible speech) speech synthesis is desired.

Figure 6A:
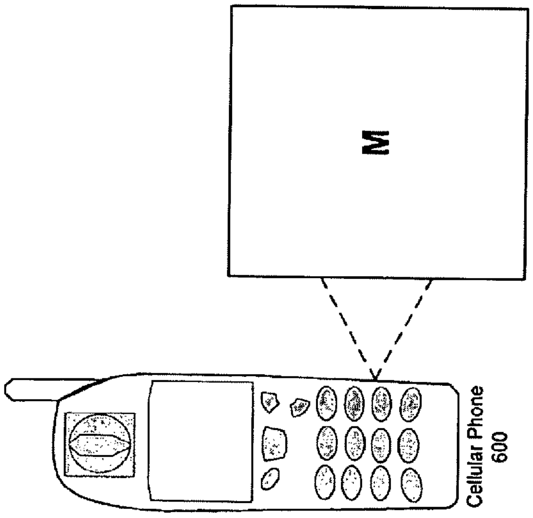
FIG. 6A illustrates a cellular phone storing a voice synthesis model obtained according to various aspects of the present invention.
Figure 6B:
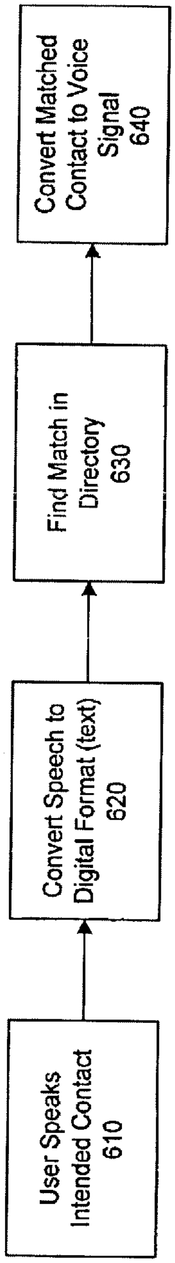
FIG. 6B illustrates a method of providing a voice activated dialing interface on a cellular phone, in accordance with one embodiment of the present invention.

FIG. 6A illustrates a cellular phone 600 having stored thereon a model M capable of synthesizing speech from a number of sources, including text, the model generated according to any of the methods illustrated in the various embodiments described herein. FIG. 6B illustrates an application wherein the model M is employed to facilitate voice activated dialing. Conventional mobile phone interfaces require a user to scroll through a list of numbers, perhaps indexed by name, stored in a directory on the phone to dial a desired number, or requires that the user punch in the number directly on the keypad. A more desirable interface may be to have the user speak the name of the person that he/she would like to contact, and have the phone automatically dial the number.

For example, the user may speak into the telephone the name of the person the user would like to contact (act 610). Speech recognition software also stored on the phone (not shown) may convert the voice signal into text or another digital representation (act 620). The digital representation, for example, a text description of the contact person, is used to index into the directory stored on the phone (act 630). When and if a match is found, the directory entry (e.g., a name index that may be in text or other digital form) is provided to the speech synthesis model to confirm that the matched contact is correct (act 640). That is, the name of the matched directory entry may be converted to a voice signal that is broadcast out of the phone's speaker so that the user can confirm that the intended contact and the matched contact are in agreement. Once confirmed, the telephone number associated with the matched contact may be automatically dialed by the telephone. Applicant has appreciated that speech synthesis models derived according to various aspects of the present invention may be compact enough to be stored on generally resource limited cellular phones and can produce relatively natural sounding speech and/or speech that is generally intelligible to the human listener, although such benefits and advantages are not a requirement or limitation on the aspects of the present invention.

Another application wherein a speech synthesis model may be applied on a cell phone is in the context of text messages, for example, short message service (SMS) messages sent from one cellular phone user to another. Such a feature would allow user's to listen to their text messages, and may be desirable to sight impaired users, or as a convenience to other users, or for entertainment purposes, etc. It should be appreciated that speech synthesis models derived from various aspects of the invention may be used in any application where speech synthesis is desirable and is not limited to applications where resources are generally limited, or to any other application specifically described herein. For example, speech synthesis models derived as described herein may be used in a telephone directory service, or a phone service that permits the user to listen to his or her e-mails, or in an automated directory service.

As discussed in the foregoing, features tracts may be identified and selected based on any number and type of voice signals. Accordingly, a model may be trained to generate speech in any of various languages. In addition, feature tracts may be selected that describe voice signals recorded from speakers of different gender, using different emotions such as angry or sad or using other speech dynamics or effects such as yelling, laughing, singing, or a particular dialect or slang. Moreover, prosody effects such as questioning or exclamatory statements, or other intonations may be trained into a speech synthesis model.

Figure 7:
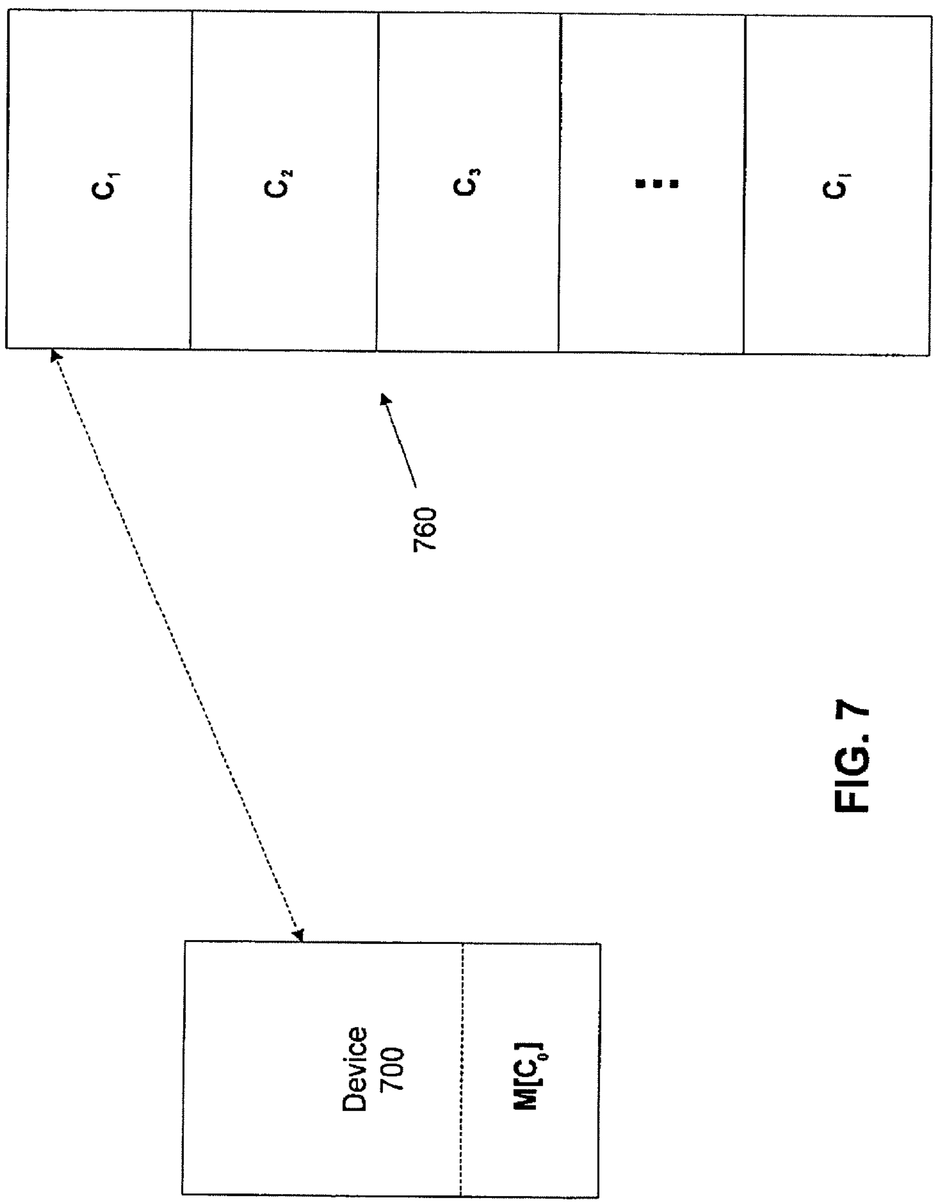
FIG. 7 illustrates a scaleable voice synthesis model capable of being enhanced with various add-on components, in accordance with one embodiment of the present invention.

Applicant has appreciated that additional components may be added to a speech synthesis model to enhance the speech synthesis model with one or more of the above add-ons. In FIG. 7, a speech synthesis model M is stored on a device 700. Model M includes a component $C_0$ which contains the functionality to generate speech descriptions for a foundation or core speaker in a particular language. For example, $C_0$ may have been trained using feature tracts selected according to aspects of the present invention for a male speaker of the English language, as described in various embodiments herein. Accordingly, when model M operates according to component $C_0$, voice signals characteristic of an English speaking male may be synthesized and perceived.

The model M may also be trained on voice signals recorded according to any number of effects, to generate multiple components $C_i$. A library 760 of such components may be generated and stored or archived. For example, library 760 may include a component adapted to generate speech perceived as being spoken with a desired emotion (e.g., angry, happy, laughing, etc.). In addition, library 760 may include a component for any number of desired languages, dialects, accents, gender, etc. Library 760 may include a component for one or any combination of speech attributes or effects, as the aspects of the invention are not limited in this respect.

The library may be made available for download or otherwise distributed for sale. For example, a cellular phone user may access the library over a network via the cellular phone and download additional components in a fashion similar to downloading additional ring tones or games for a cellular phone. The speech synthesis model, stored on the cellular phone with the standard the component, may be enhanced with one or more other components as desired by the owner/user of the cellular phone.

It should be appreciated that enhancement components may be independent of one another or may alternatively be modifications to the existing speech synthesis model. For example, $C_i$ may instruct model M on which particular formant tracts or phonemes generated by component $C_0$ need to be changed in order produce the desired effect. That is, $C_i$ may supplement the existing model M operating on $C_0$, and instruct the model how to modify or adjust the description of the voice signal such that the resulting voice signal has the desired effect. Alternatively, $C_i$ may be a relatively independent component, wherein when the desired effect characterized by $C_1$ is desired, model M generates a description (e.g., one or more feature tracts) according to $C_1$ with little or no involvement from $C_0$. Other methods of making a generally scaleable voice synthesis model may be used, as aspects of the invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, it should be appreciated that one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, various aspects of the invention may be used to train voice synthesis models of any type and trained in any way. In addition, any type and/or number of features may be selected from any number and type of voice signals or recordings. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The invention claimed is:

1. A method of processing a voice signal to extract information to facilitate training a speech synthesis model for use with a formant-based text-to-speech synthesizer, the method comprising acts of:

detecting a plurality of candidate features in the voice signal;

grouping different combinations of the plurality of candidate features into a plurality of candidate feature sets;

forming a plurality of voice waveforms, each of the plurality of voice waveforms formed, at least in part, by processing a respective one of the plurality of candidate feature sets;

performing at least one comparison between the voice signal and each of the plurality of voice waveforms;

selecting at least one of the plurality of candidate feature sets based, at least in part, on the at least one comparison with the voice signal; and training the speech synthesis model based, at least in part, on the selected at least one of the plurality of candidate feature sets.

2. The method of claim 1, further comprising an act of converting the voice signal into a same format as the plurality of voice waveforms prior to performing the at least one comparison.

3. The method of claim 1, wherein forming the plurality of voice waveforms includes forming the plurality of voice waveforms in a same format as the voice signal, and wherein the act of selecting the at least one of the plurality of candidate feature sets includes an act of selecting at least one of the plurality of candidate feature sets corresponding to a respective at least one of the plurality of voice waveforms that is most similar to the voice signal according to a first criteria, the selected one of the plurality of candidate feature sets being used to train, at least in part, the voice synthesis model.

4. The method of claim 1, further comprising an act of segmenting the voice signal into a plurality of frames, each of the plurality of frames corresponding to a respective interval of the voice signal, and wherein the acts of:

detecting a plurality of candidate features includes an act of detecting a plurality of candidate features in each of the plurality of frames; and grouping the plurality of candidate features includes an act of grouping different combinations of the plurality of candidate features detected in each of the plurality of frames into a respective plurality of candidate feature sets, each of the plurality of candidate feature sets associated with one of the plurality of frames from which the corresponding plurality of candidates features was detected, and further grouping different combinations of the plurality of candidate feature sets to form a respective plurality of candidate feature tracts.

5. The method of claim 4, wherein forming the plurality of voice waveforms includes forming the plurality of voice waveforms, each of the plurality of voice waveforms being formed, at least in part, from a respective one of the plurality of candidate feature tracts, and wherein the act of selecting the at least one of the plurality of candidate feature sets includes an act of selecting one of the plurality of candidate feature tracts associated with a respective one of the plurality of voice waveforms that is most similar to the voice signal according to the first criteria, the selected one of the plurality of feature tracts being used to train, at least in part, the voice synthesis model.

6. The method of claim 4, wherein each of the plurality of feature tracts includes an associated candidate feature set from each of the plurality of frames.

7. The method of claim 4, wherein the acts of:

detecting a plurality of candidate features in each of the plurality of frames includes an act of detecting at least one candidate formant; and grouping the plurality of candidate features includes an act of grouping the plurality of candidate features such that each of the plurality of candidate feature sets includes at least one value representative of the at least one candidate formant detected in the respective frame.

8. The method of claim 7, wherein the acts of:

detecting includes an act of detecting a plurality of candidate formants; and grouping the plurality of candidate features includes an act of grouping the plurality of candidate features into the plurality of candidate feature sets for each of the plurality of frames such that each of the plurality of candidate feature sets includes at least one value representative of each of a first formant, a second formant and a third formant detected in the respective frame.

9. The method of claim 8, wherein the act of detecting includes an act of detecting at least one additional feature selected from the group consisting of: pitch, timbre, energy and spectral slope.

10. A computer readable medium encoded with a program for execution on at least one processor, the program, when executed on the at least one processor, performing a method of processing a voice signal to extract information to facilitate training a speech synthesis model for use with a formant-based text-to-speech synthesizer, the method comprising acts of:

detecting a plurality of candidate features in the voice signal;

grouping different combinations of the plurality of candidate features into a plurality of candidate feature sets;

forming a plurality of voice waveforms, each of the plurality of voice waveforms formed, at least in part, by processing a respective one of the plurality of candidate feature sets;

performing at least one comparison between the voice signal and each of the plurality of voice waveforms;

selecting at least one of the plurality of candidate feature sets based, at least in part, on the at least one comparison with the voice signal; and training the speech synthesis model based, at least in part, on the selected at least one of the plurality of candidate feature sets.

11. The computer readable medium of claim 10, further comprising an act of converting the voice signal into a same format as the plurality of voice waveforms prior to performing the at least one comparison.

12. The computer readable medium of claim 10, wherein forming the plurality of voice waveforms includes forming the plurality of voice waveforms in a same format as the voice signal, and wherein the act of selecting the at least one of the plurality of candidate feature sets includes an act of selecting at least one of the plurality of candidate feature sets corresponding to a respective at least one of the plurality of voice waveforms that is most similar to the voice signal according to a first criteria, the selected one of the plurality of candidate feature sets being used to train, at least in part, the voice synthesis model.

13. The computer readable medium of claim 10, further comprising an act of segmenting the voice signal into a plurality of frames, each of the plurality of frames corresponding to a respective interval of the voice signal, and wherein the acts of:

detecting a plurality of candidate features includes an act of detecting a plurality of candidate features in each of the plurality of frames; and grouping the plurality of candidate features includes an act of grouping different combinations of the plurality of candidate features detected in each of the plurality of frames into a respective plurality of candidate feature sets, each of the plurality of candidate feature sets associated with one of the plurality of frames from which the corresponding plurality of candidates features was detected, and further grouping different combinations of the plurality of candidate feature sets to form a respective plurality of candidate feature tracts.

14. The computer readable medium of claim 13, wherein forming the plurality of voice waveforms includes forming the plurality of voice waveforms, each of the plurality of voice waveforms being formed, at least in part, from a respective one of the plurality of candidate feature tracts, and wherein the act of selecting the at least one of the plurality of candidate feature sets includes an act of selecting one of the plurality of candidate feature tracts associated with a respective one of the plurality of voice waveforms that is most similar to the voice signal according to the first criteria, the selected one of the plurality of feature tracts being used to train, at least in part, the voice synthesis model.

15. The computer readable medium of claim 13, wherein each of the plurality of feature tracts includes an associated candidate feature set from each of the plurality of frames.

16. The computer readable medium of claim 13, wherein the acts of:

detecting a plurality of candidate features in each of the plurality of frames includes an act of detecting at least one formant; and grouping the plurality of candidate features includes an act of grouping the plurality of candidate features such that each of the plurality of candidate feature sets includes at least one value representative of at least one candidate formant detected in the respective frame.

17. The computer readable medium of claim 16, wherein the acts of:

detecting includes an act of detecting a plurality of candidate formants; and grouping the plurality of candidate features includes an act of grouping the plurality of candidate features into the plurality of candidate feature sets for each of the plurality of frames such that each of the plurality of candidate feature sets includes at least one value representative of each of a first formant, a second formant and a third formant detected in the respective frame.

18. The computer readable medium of claim 17, wherein the act of detecting includes an act of detecting at least one additional feature selected from the group consisting of: pitch, timbre, energy and spectral slope.

19. A computer readable medium encoded with a speech synthesis model for use with a formant-based text-to-speech synthesizer adapted to, when operating, generate human recognizable speech, the speech synthesis model trained to generate the human recognizable speech, at least in part, by performing acts of:

detecting a plurality of candidate features in the voice signal;

grouping different combinations of the plurality of candidate features into a plurality of candidate feature sets;

forming a plurality of voice waveforms, each of the plurality of voice waveforms formed, at least in part, by processing a respective one of the plurality of candidate feature sets;

performing at least one comparison between the voice signal and each of the plurality of voice waveforms;

selecting at least one of the plurality of candidate feature sets based, at least in part, on the at least one comparison with the voice signal; and training the speech synthesis model based, at least in part, on the selected at least one of the plurality of candidate feature sets.

20. The computer readable medium of claim 19, further comprising an act of converting the voice signal into a same format as the plurality of voice waveforms prior to performing the at least one comparison.

21. The computer readable medium of claim 19, wherein forming the plurality of voice waveforms includes forming the plurality of voice waveforms in a same format as the voice signal, and wherein the act of selecting the at least one of the plurality of candidate feature sets includes an act of selecting at least one of the plurality of candidate feature sets corresponding to a respective at least one of the plurality of voice waveforms that is most similar to the voice signal according to a first criteria, the selected one of the plurality of candidate feature sets being used to train, at least in part, the voice synthesis model.

22. The computer readable medium of claim 19, further comprising an act of segmenting the voice signal into a plurality of frames, each of the plurality of frames corresponding to a respective interval of the voice signal, and wherein the acts of:

detecting a plurality of candidate features includes an act of detecting a plurality of candidate features in each of the plurality of frames; and grouping the plurality of candidate features includes an act of grouping different combinations of the plurality of candidate features detected in each of the plurality of frames into a respective plurality of candidate feature sets, each of the plurality of candidate feature sets associated with one of the plurality of frames from which the corresponding plurality of candidates features was detected, and further grouping different combinations of the plurality of candidate feature sets to form a respective plurality of candidate feature tracts.

23. The computer readable medium of claim 22, wherein forming the plurality of voice waveforms includes forming the plurality of voice waveforms, each of the plurality of voice waveforms being formed, at least in part, from a respective one of the plurality of candidate feature tracts, and wherein the act of selecting the at least one of the plurality of candidate feature sets includes an act of selecting one of the plurality of candidate feature tracts associated with a respective one of the plurality of voice waveforms that is most similar to the voice signal according to the first criteria, the selected one of the plurality of feature tracts being used to train, at least in part, the voice synthesis model.

24. The computer readable medium of claim 22, wherein each of the plurality of feature tracts includes an associated candidate feature set from each of the plurality of frames.

25. The computer readable medium of claim 22, wherein the acts of:

detecting a plurality of candidate features in each of the plurality of frames includes an act of detecting at least one formant; and grouping the plurality of candidate features includes an act of grouping the plurality of candidate features such that each of the plurality of candidate feature sets includes at least one value representative of at least one candidate formant detected in the respective frame.

26. The computer readable medium of claim 25, wherein the acts of:

detecting includes an act of detecting a plurality of candidate formants; and grouping the plurality of candidate features includes an act of grouping the plurality of candidate features into the plurality of candidate feature sets for each of the plurality of frames such that each of the plurality of candidate feature sets includes at least one value representative of each of a first formant, a second formant and a third formant detected in the respective frame.

27. The computer readable medium of claim 26, wherein the act of detecting includes an act of detecting at least one additional feature selected from the group consisting of: pitch, timbre, energy and spectral slope.

* * * * *